United States Patent
Kim et al.

(10) Patent No.: US 9,917,503 B2
(45) Date of Patent: Mar. 13, 2018

(54) OVERCURRENT PROTECTION CIRCUIT AND POWER FACTOR CORRECTION CIRCUIT COMPRISING THE SAME

(71) Applicant: FAIRCHILD KOREA SEMICONDUCTOR LTD., Bucheon-si (KR)

(72) Inventors: Taesung Kim, Incheon (KR); Gwanbon Koo, Bucheon-si (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 1 day.

(21) Appl. No.: 15/154,094

(22) Filed: May 13, 2016

(65) Prior Publication Data
US 2016/0336847 A1    Nov. 17, 2016

Related U.S. Application Data

(60) Provisional application No. 62/160,876, filed on May 13, 2015.

(51) Int. Cl.
| | |
|---|---|
| *H02H 7/122* | (2006.01) |
| *H02M 1/32* | (2007.01) |
| *H02M 3/335* | (2006.01) |
| *H02M 1/42* | (2007.01) |

(52) U.S. Cl.
CPC ........... *H02M 1/32* (2013.01); *H02M 1/4258* (2013.01); *H02M 3/33523* (2013.01); *Y02B 70/126* (2013.01)

(58) Field of Classification Search
CPC .... H02M 1/32; H02M 1/4208; H02M 1/4258; H02M 3/33523; H02M 3/33553; Y02B 70/12; Y02B 70/126
USPC ........ 363/21.04–21.18, 50, 55, 56.01, 56.03; 323/205, 207
See application file for complete search history.

(56) References Cited

U.S. PATENT DOCUMENTS

| | | | | |
|---|---|---|---|---|
| 6,295,214 | B1 * | 9/2001 | Matsumoto | H02M 3/33507 363/21.01 |
| 8,520,415 | B1 * | 8/2013 | Krishnamoorthy | H02M 3/33523 363/21.07 |
| 8,559,152 | B2 * | 10/2013 | Cao | H02M 1/32 363/56.03 |
| 9,331,588 | B2 * | 5/2016 | Chen | H02M 3/33523 |
| 2010/0019809 | A1 * | 1/2010 | Hwang | H02M 1/4208 327/129 |
| 2011/0267853 | A1 * | 11/2011 | Yang | H02M 1/32 363/56.01 |

* cited by examiner

*Primary Examiner* — Alex Torres-Rivera
(74) *Attorney, Agent, or Firm* — Okamoto & Benedicto LLP

(57) ABSTRACT

A power factor correction circuit includes an overcurrent protection circuit, and the overcurrent protection circuit detects at least one of a line input voltage, a switch current of a power factor correction circuit, and a line period peak and performs overcurrent protection operations using a detection result.

22 Claims, 13 Drawing Sheets

# OVERCURRENT PROTECTION CIRCUIT AND POWER FACTOR CORRECTION CIRCUIT COMPRISING THE SAME

CROSS-REFERENCE TO RELATED APPLICATIONS

This application claims priority from U.S. Provisional Application No. 62/160,876, filed on May 13, 2015 with the United States Patent and Trademark Office, the entire contents of which are incorporated herein by reference.

BACKGROUND (a) Technical Field

The present invention relates to an overcurrent protection circuit and a power factor correction circuit including the same.

(b) Description of the Related Art

In a power factor correction circuit according to a related art, DC over current protection (hereinafter, DC OCP) is used for preventing a damage caused by overcurrent. In an over load or maximum powering condition, an inductor current of a power factor correction circuit is limited by DC OCP.

In a DC OCP situation by the overcurrent or maximum powering condition, maximum input power of a power factor correction circuit is not limited, and the maximum input power may be changed according to a line input voltage. Thus, in a case in which output of the power factor correction circuit is limited by DC OCP, ringing of a line input voltage passing through a line filter occurs, and a high voltage stress is applied to a switching element of a power factor correction circuit.

SUMMARY

An overcurrent protection circuit not affected by a line input voltage of a power factor correction circuit, and providing overcurrent protection, and a power factor correction circuit including the same, are to be provided.

A power factor correction circuit according to an aspect may include a switch converting a line input voltage into output power, and an overcurrent protection circuit controlling a current of the switch. The overcurrent protection circuit may control a peak of the current of the switch to follow a sine wave in synchronization with the line input voltage.

The overcurrent protection circuit according to an aspect may include a first current source generating a first current according to a line period peak which is a period unit peak of the line input voltage, a second current source generating a second current according to a line detection voltage corresponding to the line input voltage, a comparator determining whether a first voltage increased by the first current source reaches an overcurrent protection threshold voltage, and a capacitor receiving the second current according to output of the comparator. The overcurrent protection circuit is synchronized with output of the comparator and sampling a voltage of the capacitor, thereby generating a regular overcurrent protection reference.

The overcurrent protection circuit may include a first capacitor including one end coupled to the first current source, and a transistor coupled to the first capacitor in parallel. The transistor may be switching-operated according to a clock signal having a predetermined period.

The overcurrent protection circuit may include a first transistor coupled between the second current source and the capacitor, and a second transistor coupled to the capacitor in parallel. The first transistor may be switching-operated according to output of the comparator.

The overcurrent protection circuit may reset the first voltage according to a clock signal having a predetermined period, and may sample a voltage of the capacitor according to a signal generated based on the clock signal and output of the comparator.

According to another aspect, an overcurrent protection circuit may control a maximum peak of the current of the switch to be constant by controlling a maximum on-time of the switch.

The overcurrent protection circuit according to another aspect may include a peak detecting unit generating a detection voltage peak corresponding to a peak of the switch current by a line period unit of the line input voltage, and a maximum on-time calculating unit setting an overcurrent reference voltage corresponding to an overcurrent reference using a predetermined overcurrent protection threshold voltage and a PWM signal controlling switching operations of the switch, and calculating the maximum on-time according to the detection voltage peak and the overcurrent reference voltage for a predetermined set period of time.

The maximum on-time calculating unit may include a current source generating a first current according to the overcurrent protection threshold voltage for the set period of time, and a capacitor coupled to the current source. In addition, the maximum on-time calculating unit may generate a first voltage by supplying the first current to the capacitor, and may generate the overcurrent reference voltage by sampling the first voltage for a period of time according to the PWM signal.

The maximum on-time calculating unit may further include a transistor coupled to the capacitor in parallel, and switching-operated according to a signal in which the PWM signal is inverted. The first voltage may have a sampling period synchronized with the PWM signal.

The maximum on-time calculating unit may include a current source generating a second current according to the detection voltage peak not for the set period of time but for a non-set period of time, a capacitor coupled to the current source, and a comparator comparing a voltage of the capacitor and the overcurrent reference voltage. The maximum on-time may be determined according to output of the comparator.

The overcurrent protection circuit according to another aspect may include a line voltage detecting unit generating a line detection voltage by detecting the line input voltage, a peak detecting unit detecting a line period peak which is a line period unit peak of the line input voltage, and a maximum on-time calculating unit setting an overcurrent reference voltage corresponding to an overcurrent reference using the line detection voltage and a PWM signal controlling switching operations of the switch, and calculating the maximum on-time according to a result of comparing a voltage generated based on the line period peak and the PWM signal and the overcurrent reference voltage, for an overcurrent threshold period of time in which a peak of the switch current is the same as a threshold value.

The maximum on-time calculating unit may include a current source generating a first current according to the line detection voltage for the overcurrent threshold period of time, and a capacitor coupled to the current source. In addition, the maximum on-time calculating unit may generate a first voltage by supplying the first current to the capacitor and may sample the first voltage, thereby generating the overcurrent reference voltage for a period of time according to the PWM signal.

The maximum on-time calculating unit may further include a transistor coupled to the capacitor in parallel, and switching-operated according to a signal in which the PWM signal is inverted. The first voltage may have a sampling period synchronized with the PWM signal.

The maximum on-time calculating unit may generate the overcurrent reference voltage by multiplying the sampled voltage by a first ratio. The first ratio may be a ratio of an overcurrent threshold voltage corresponding to the threshold value with respect to a predetermined overcurrent protection threshold voltage.

The maximum on-time calculating unit may include a current source generating a second current according to the line period peak after the overcurrent threshold period of time, a capacitor coupled to the current source, and a comparator comparing a voltage of the capacitor and the overcurrent reference voltage. The maximum on-time may be determined according to output of the comparator.

The overcurrent protection circuit according to another aspect may include a peak detecting unit detecting a line period peak which is a line period unit peak of the line input voltage, and a maximum on-time calculating unit setting an overcurrent reference voltage corresponding to an overcurrent reference for an overcurrent threshold period of time using a line period peak in a case in which a peak of the switch current is the same as a threshold value and a PWM signal controlling switching operations of the switch, and calculating the maximum on-time according to a result of comparing a voltage generated based on the line period peak and the PWM signal and the overcurrent reference voltage. The overcurrent threshold period of time may be a period of time in which the switch current is the same as the threshold value.

The maximum on-time calculating unit may include a current source generating a first current according to the line period peak for the overcurrent threshold period of time, and a capacitor coupled to the current source. In addition, the maximum on-time calculating unit may generate a first voltage by supplying the first current to the capacitor for a period of time according to the PWM signal, may sample the first voltage, and may generate the overcurrent reference voltage based on a minimum voltage of a voltage sampled for the overcurrent threshold period of time.

The maximum on-time calculating unit may further include a comparator comparing the first voltage and the sampled voltage, and a logic gate controlling sampling operations according to the PWM signal and output of the comparator. In a case in which the first voltage is the sampled voltage or more, the logic gate may disable the sampling operations according to the comparator output.

The maximum on-time calculating unit may further include a first capacitor charged by the first voltage through a first switch switching-operated according to the PWM signal, and a second capacitor charged by a voltage of the first capacitor through a second switch switching-operated according to output of the logic gate. The comparator may have a first input terminal coupled to one end of the first capacitor, and the comparator may have a second input terminal coupled to one end of the second capacitor.

The maximum on-time calculating unit may further include a transistor coupled to the capacitor in parallel, and switching-operated according to a signal in which the PWM signal is inverted. The first voltage may have a sampling period synchronized with the PWM signal.

The maximum on-time calculating unit may generate the overcurrent reference voltage by multiplying the sampled voltage by a first ratio. The first ratio may be a ratio of an overcurrent threshold voltage corresponding to the threshold value with respect to a predetermined overcurrent protection threshold voltage.

The maximum on-time calculating unit may include a current source generating a second current according to the line period peak after the overcurrent threshold period of time, a capacitor coupled to the current source, and a comparator comparing a voltage of the capacitor and the overcurrent reference voltage. The maximum on-time may be determined according to output of the comparator.

An overcurrent protection circuit not affected by a line input voltage of a power factor correction circuit and providing overcurrent protection, and a power factor correction circuit including the same, are provided.

DETAILED DESCRIPTION OF THE EMBODIMENTS

Figure 1:
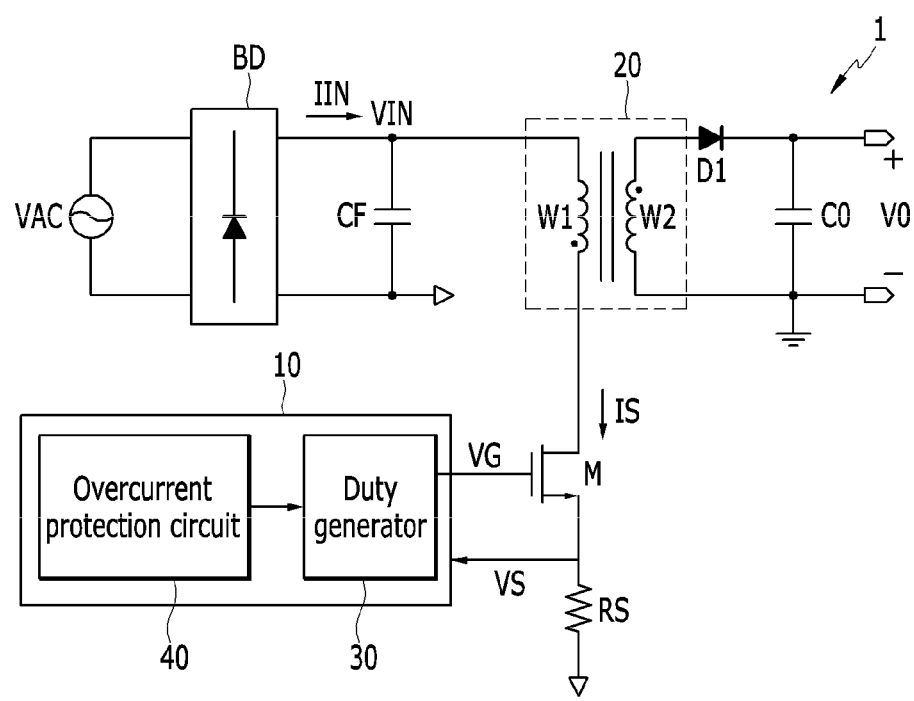
FIG. 1 is a drawing illustrating a power factor correction circuit.

Hereinafter, embodiments of the present invention will be described in detail as follows with reference to the attached drawings to be easily performed by those skilled in the art.

The present inventive concept may, however, be exemplified in many different forms and should not be construed as being limited to the specific embodiments set forth herein. In addition, in the drawing, parts not related to the description is omitted in order to clearly describe the present invention, and similar reference characters are described with respect to similar parts throughout the specification.

Throughout the specification, it will be understood that when a part is referred to as being "connected to," another element, it can be directly "connected to," the other element or "electrically connected to," other elements intervening therebetween. In addition, when a part may "include" any component, which means that other components are not excluded, but other components may be further included without a contrary description.

An overcurrent protection circuit according to a first embodiment limits a peak of a switching current for each switching operation of a power factor correction circuit, thereby normalizing an over current protection reference. For example, the overcurrent protection circuit detects a peak (hereinafter, referred to as a line period peak) of a line input voltage for each period (hereinafter, referred to as a line period) of a line input voltage, detects a line input voltage, and sets a regular overcurrent protection reference having a fixed peak level based on the peak in each line period and the line input voltage which are detected.

An overcurrent protection circuit according to second to fourth embodiments may limit a switching current based on a peak which is an overcurrent protection threshold voltage or less by setting a maximum on-time of a switching element. In order to control a current flowing in the switching element not to reach overcurrent in a predetermined level, a threshold voltage in comparison with a voltage corresponding to a current flowing in the switching element is referred to as the overcurrent protection threshold voltage (hereinafter, an OCP voltage).

Hereinafter, with reference to a drawing, an overcurrent protection circuit according to embodiments and a power factor correction circuit including the same will be described.

FIG. 1 is a drawing illustrating a power factor correction circuit.

As described in FIG. 1, a power factor correction circuit 1 may include a rectifier circuit BD, a switch control circuit 10, transformer 20, a rectifier diode D1, an output capacitor CO, a power switch M, a sense resistor RS, and a filter capacitor CF.

In FIG. 1, the power factor correction circuit 1 is implemented as a flyback type switch mode power supply (hereinafter, SMPS) including a transformer 20 converting a line input voltage VIN into an output voltage VO according to switching operations of the power switch M. Embodiments of the present invention are not limited to the flyback type SMPS, and another type converter such as a boost converter or the like may be used instead of the flyback type SMPS.

The rectifier circuit BD may rectify an AC input voltage VAC, thereby generating a line input voltage VIN. The input current IIN may flow toward a filter capacitor CF and a primary winding W1 through the rectifier circuit BD. A switch current IS may flow through the power switch M for a period of time in which the power switch M is turned on.

Both ends of the filter capacitor CF may be connected to both ends of the rectifier circuit BD in parallel. The line input voltage VIN may be supplied to the transformer 20 through the filter capacitor CF.

The line input voltage VIN may be supplied to one end of the primary winding W1, and a drain of the power switch M may be connected to the other end of the primary winding W1. The sense resistor RS may be connected between a source and a ground of the power switch M. A gate voltage VG may be input to a gate of the power switch M. An electric power transferred from a primary side to a secondary side is controlled by switching operations of the power switch M, whereby the line input voltage VIN may be converted into an output voltage VO or an output current IO.

The secondary winding W2 may be electromagnetically combined with the primary winding W1, and an anode electrode of the rectifier diode D1 may be connected to one end of the secondary winding W2. In a case in which the rectifier diode D1 is conducted, a current flowing in the secondary winding W2 may be transferred to a load (not shown) connected to an output capacitor COUT and output terminals (+, −).

In a case in which the power switch M is turned on, the switch current IS flows through the power switch M, and energy is stored in the primary winding W1. During the period of time, the rectifier diode D1 is in a non-conductive state. In a case in which the power switch M is turned off and the rectifier diode D1 is conducted, the energy stored in the primary winding W1 is transferred to the secondary winding W2, and a current flowing in the secondary winding W2 flows through the rectifier diode D1.

The switch control circuit 10 may determine a duty of the power switch M using feedback information corresponding to the output voltage VO, and may generate the gate voltage VG controlling switching operations of the power switch M. As the power switch M is an n channel transistor, a level of the gate voltage VG turning on the power switch M may be a high level, and a level of the gate voltage VG turning off the power switch M may be a low level.

The switch control circuit 10 may sense the switch current IS based on a sense voltage VS generated in the sense resistor RS. The switch control circuit 10 may start overcurrent protection operations when the sense voltage VS reaches a predetermined OCP voltage. For example, the power switch M may be turned off by the overcurrent protection operations.

The switch control circuit 10 may include a duty generator 30 and an overcurrent protection circuit 40.

In addition, the overcurrent protection circuit 40 according to a first embodiment may generate a regular overcurrent protection reference, and may transfer the regular overcurrent protection reference to the duty generator 30. The duty generator 30 may control switching operations based on a result of comparing the regular overcurrent protection reference and the sense voltage VS. For example, the power switch M may be turned off according to a result of comparing the regular overcurrent protection reference and the sense voltage VS instead of feedback information in order to prevent overcurrent. In this case, a peak of the switch current IS is limited, whereby the sense voltage VS may not reach an OCP voltage.

In addition, the overcurrent protection circuit 40 according to a second embodiment may set a maximum on-time of a switching element, and may transfer information on the maximum on-time to the duty generator 30. The duty generator 30 may turn off the power switch M in a case in which a period of time in which the power switch M is turned on reaches the maximum on-time. In this case, a peak of the switch current IS is limited, the sense voltage VS may not reach an OCP voltage.

Hereinafter, with reference to FIGS. 2 and 3, an overcurrent protection circuit according to a first embodiment will be described.

Figure 2:
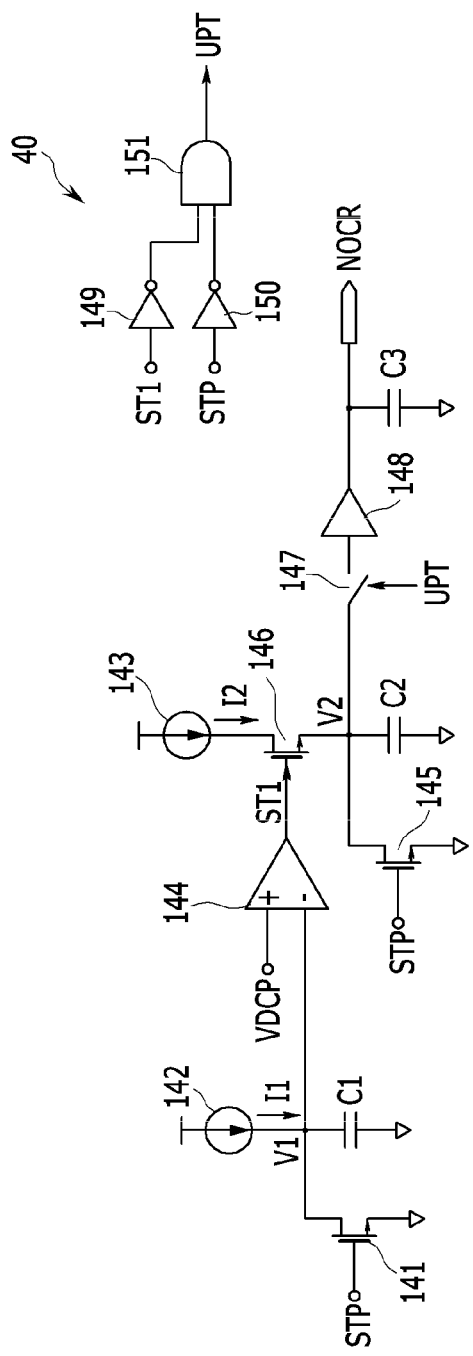
FIG. 2 is a drawing illustrating an example of an overcurrent protection circuit according to the first embodiment.

FIG. 2 is a drawing illustrating an example of the overcurrent protection circuit according to the first embodiment.

The overcurrent protection circuit 40 may generate a regular overcurrent protection reference NOCR having a predetermined voltage as a peak and following a sine wave. In this case, the peak of the regular overcurrent protection reference NOCR may be set as an OCP voltage VDCP. The overcurrent protection circuit 40 may generate a regular overcurrent protection reference NOCR synchronized with the line input voltage VIN by controlling the regular overcurrent protection reference NOCR according to the line input voltage VIN for each period of a clock signal STP having a predetermined frequency.

The overcurrent protection circuit 40 may receive a line detection voltage VID and a line period peak VIDP, thereby generating a current I1 according to the line period peak VIDP and a current I2 according to the line detection voltage VID. The line period peak VIDP may be a peak of the line input voltage VIN in an immediately preceding period, and the line detection voltage VID may be a voltage in which the line input voltage VIN is sensed.

The overcurrent protection circuit 40 may generate a voltage V1 with a current I1, may generate a voltage V2 with a current I2 for a period of time in which the voltage V1 reaches the OCP voltage VDCP, and may generate the regular overcurrent protection reference NOCR by sampling the voltage V2 for each period of the clock signal STP.

As described in FIG. 2, the overcurrent protection circuit 40 may include three transistors 141, 145, and 146, two current sources 142 and 143, a comparator 144, a switch 147, two inverters 149 and 150, a logic gate 151, three capacitors C1, C2, and C3, and a buffer 148.

The current source 142 may generate a current I1 according to the line period peak VIDP, and the current source 143 may generate a current I2 according to the line detection voltage VID.

The capacitor C1 is connected to the current source 142 and may be charged by the current I1. The transistor 141 may be connected to the capacitor C1 in parallel, the capacitor C1 may be charged by the current I1 for a period of time in which the transistor 141 is turned off by the clock signal STP, thereby increasing the voltage V1. In a case in which the transistor 141 is turned on by the clock signal STP, the capacitor C1 may be discharged, whereby the voltage V1 is reset to a ground level.

The comparator 144 may output a high level in a case in which an input of a non-inverting terminal (+) is an input of an inverting terminal (−) or greater. In the opposite case, the comparator 144 may output a low level. The OCP voltage VDCP is input to the non-inverting terminal (+) of the comparator 144, and the voltage V1 may input to the inverting terminal (−) of the comparator 144. Thus, the comparator 144 may output a signal ST1 in a low level for a period of time in which the voltage V1 is higher than the OCP voltage VDCP, and may output a signal ST1 in a high level for a period of time in which the voltage V1 is the OCP voltage VDCP or less.

The capacitor C2 is connected to the current source 143 and may be charged by the current I2. The transistor 146 may be connected between the capacitor C2 and the current source 143, and the transistor 145 may be connected to the capacitor C2 in parallel. For a period of time in which the transistor 146 is turned on by the signal ST1 and the transistor 141 is turned off by the clock signal STP, the capacitor C2 is charged by the current I2, thereby increasing the voltage V2. In a case in which the transistor 146 is turned off by the signal ST1, the voltage V2 is maintained by the capacitor C2. In a case in which the transistor 141 is turned on by the clock signal STP, the capacitor C2 may be discharged, whereby the voltage V2 is reset to a ground level.

The signal ST1 and the signal STP may be inverted by the inverters 149 and 150, respectively, and may be input to the logic gate 151. The logic gate 151 may perform an AND operation, thereby generating a signal UPT.

The switch 147 may be switching-operated by the signal UPT, and the voltage V2 may be sampled by the capacitor C3 through the buffer 148 for a period of time in which the switch 147 is turned on. The voltage sampled by the capacitor C3 may be the regular overcurrent protection reference NOCR.

Figure 3:
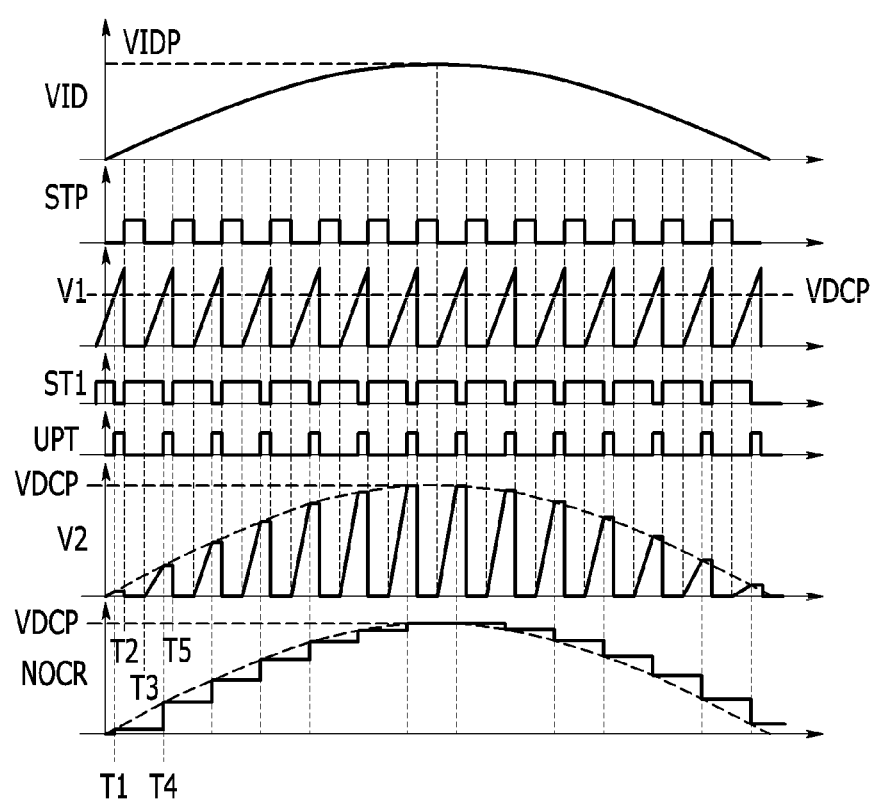
FIG. 3 is a waveform diagram illustrating signals of the overcurrent protection circuit according to the first embodiment.

FIG. 3 is a waveform diagram illustrating signals of an overcurrent protection circuit according to the first embodiment.

In FIG. 3, a line detection voltage VID may be a sine wave, and a line period peak VIDP may be illustrated by a dotted line. The line period peak VIDP may be a peak of the line input voltage VIN in an immediately preceding period. Peaks in an adjacent line period may be substantially the same.

For a low level period of time of the clock signal STP, the voltage V1 may be increased with the current I1 according to the line period peak VIDP, and at a time T1 in which the increased voltage V1 reaches the OCP voltage VDCP, the signal ST1 may be in a low level. In this case, at the time T1, the signal UPT may be increased to a high level, and at a time T2, the signal STP may be increased to a high level, whereby the signal UPT may be falling to a low level. For a high level period of time T1-T2 of the signal UPT, the voltage V2 is sampled by the capacitor C3, thereby determining a level of the regular overcurrent protection reference NOCR. As an increasing slope of the current I1 is according to the line period peak VIDP, the increasing slope thereof may be the same for at least one period.

At a time T3, the clock signal STP is falling to a low level and the transistor 141 is turned off, and the voltage V1 begins to increase. Then, the transistor 145 is turned off, and the voltage V2 begins to increase with the current I2 according to the line detection voltage VID. A rising slope of the voltage V2 is determined according to the current I2, and the current I2 is according to the line detection voltage VID. Thus, a rising slope of the voltage V2 is increased according to a line detection voltage VID, and then decreased after a peak of the line detection voltage VID.

At a time T4 in which the increased voltage V1 reaches the OCP voltage VDCP, the signal ST1 is in a low level. In this case, at the time T4, the signal UPT is increased to a high level, and at a time T5, the signal STP is increased to a high level, whereby the signal UPT is falling to a low level. For a high level period of time T4-T5 of the signal UPT, the voltage V2 is sampled by the capacitor C3, thereby determining a level of the regular overcurrent protection reference NOCR.

In such a manner, a level of the regular overcurrent protection reference NOCR is increased along the line detection voltage VID until a peak time of the line detection voltage VID, and the level thereof is decreased after the peak time.

The overcurrent protection circuit according to a second embodiment may calculate maximum on-time information at a line period peak. For example, the overcurrent protection circuit may calculate a time in which the switch current IS at the line period peak reaches a predetermined threshold value, as a maximum on-time. Specifically, the overcurrent protection circuit may calculate a period from a time in which the sense voltage VS begins to increase to a time in which the sense voltage VS reaches the OCP voltage VDCP, at the line period peak, as a maximum on-time.

Figure 4:
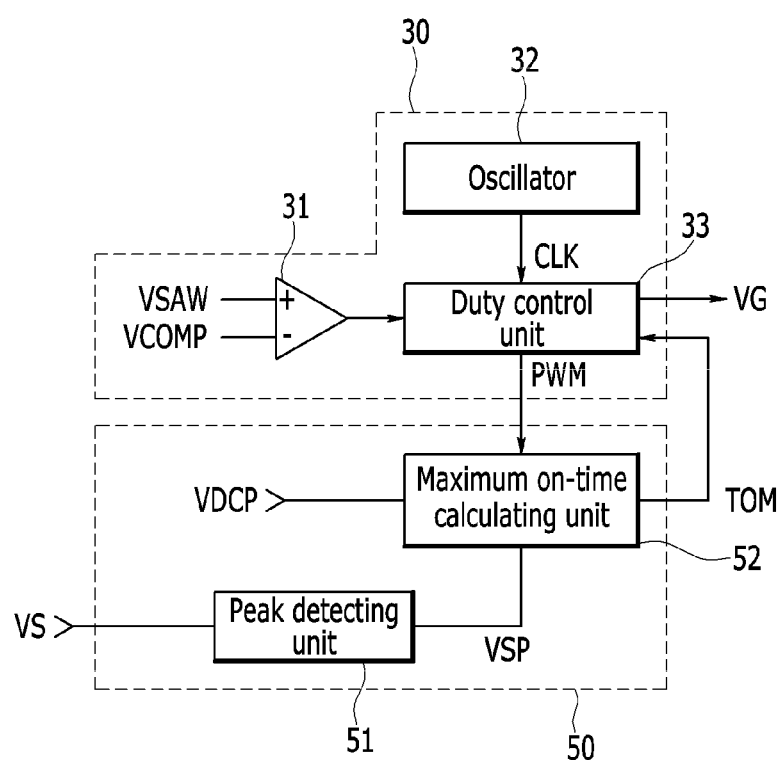
FIG. 4 is a block diagram schematically illustrating the overcurrent protection circuit according to the second embodiment.

FIG. 4 is a block diagram schematically illustrating the overcurrent protection circuit according to the second embodiment.

Figure 5:
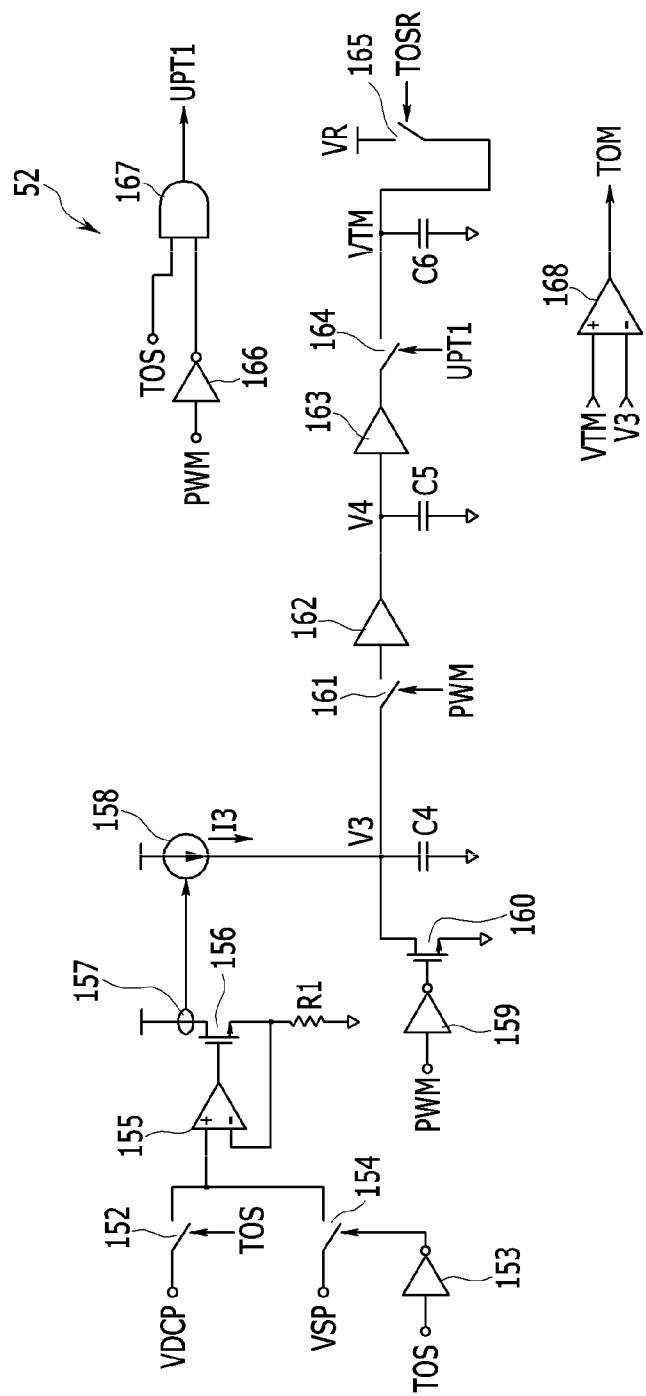
FIG. 5 is a drawing illustrating an example of a maximum on-time calculating unit illustrated in FIG. 4.

FIG. 5 is a drawing illustrating an example of the maximum on-time calculating unit illustrated in FIG. 4.

As described in FIG. 4, the duty generator 30 may include a comparator 31, oscillator 32, and a duty control unit 33.

The oscillator 32 may generate a clock signal CLK controlling a switching period, and the comparator 31 may output a result of comparing a voltage VCOMP according to the sawtooth wave VSAW and the output voltage VO.

The duty control unit 33 is synchronized with the clock signal CLK and turn on the power switch M, and turn off the power switch M at a time in which the sawtooth wave VSAW reaches the voltage VCOMP. The duty control unit 33 may generate a signal PWM according to the clock signal CLK and output of the comparator 11. For example, the duty control unit 33 may generate the signal PWM in a level (hereinafter, a high level) which is synchronized with the clock signal CLK and turns on the power switch M, and may generate the signal PWM in a level (hereinafter, a low level) which is synchronized with a falling edge of output of the comparator 11 and turns off the power switch M.

The duty control unit 33 may generate the gate voltage VG based on the signal PWM. The duty control unit 33 may control an on-time of the power switch M based on a maximum on-time signal TOM with the signal PWM. For example, even in a case in which the signal PWM is in a high level, when the maximum on-time signal TOM indicates the duty control unit 33 to turn off the power switch M, the duty control unit 33 allows the gate voltage VG to be falling to a low level, thereby turning off the power switch M.

The overcurrent protection circuit 50 may include a peak detecting unit 51 and a maximum on-time calculating unit 52.

The peak detecting unit 51 may detect a maximum peak (hereinafter, a detection voltage peak VSP), of the sense voltage VS by a line period unit. The detection voltage peak VSP may be changed according to the line period peak VIDP. For example, in a case in which the line period peak VIDP is increased, the corresponding detection voltage peak VSP may be also increased.

The maximum on-time calculating unit 52 may receive the OCP voltage VDCP, the signal PWM, and the detection voltage peak VSP, may set a voltage (hereinafter, an overcurrent reference voltage) corresponding to an overcurrent reference using the OCP voltage VDCP and the signal PWM for a predetermined set period of time, and may control a maximum on-time according to the detection voltage peak VSP and the overcurrent reference voltage for a non-set period of time. A period of time other than a set period of time is referred to as a non-set period of time.

FIG. 5 is a drawing illustrating an example of the maximum on-time calculating unit according to the second embodiment.

The maximum on-time calculating unit 52 may include five switches 152, 154, 161, 164, and 165, two transistors 156 and 160, an operational amplifier 155, three inverters 153, 159, and 166, a current mirror circuit 157, a current source 158, two buffers 162 and 163, three capacitors C4 to C6, a logic gate 167, a resistance R1, and a comparator 168.

The switch 152 may be turned on by a signal TOS for a set period of time, and the OCP voltage VDCP is input into a non-inverting terminal (+) of the operational amplifier 155. The switch 154 may be turned on by a signal TOS inverted by the inverter 153 for a non-set period of time, and the detection voltage peak VSP may be input to a non-inverting terminal (+) of the operational amplifier 155 for a non-set period of time.

An output terminal of the operational amplifier 155 is connected to a gate of the transistor 156, and an inverting terminal (−) of the operational amplifier 155 may be connected to one end of a resistance R1. In addition, the operational amplifier 155 generates output based on a difference between a voltage of the non-inverting terminal (+) and a voltage of the inverting terminal (−), thereby controlling the transistor 156 to allow the voltage of the non-inverting terminal (+) and the voltage of the inverting terminal (−) to be the same.

In a case in which a current flows through the transistor 156 and the resistance R1, one end voltage of the resistance R1 is determined according to a current flowing in the resistance R1 and input to the inverting terminal (−) of the operational amplifier 155. The operational amplifier 155 may generate output according to a difference between the voltage of the non-inverting terminal (+) and the voltage of the inverting terminal (−). In a case in which the difference between two voltages is increased, the output thereof is also increased. Thus, a current flowing in the resistance R1 is increased, and the voltage of the inverting terminal (−) is increased. On the contrary, in a case in which a difference between two voltages is decreased, the output thereof is decreased. This, a current flowing in the resistance R1 is decreased, and the voltage of the inverting terminal (−) is decreased.

As described above, the voltage of the inverting terminal (−) may be according to the voltage of the non-inverting terminal (+) by the operational amplifier 155, and the current flowing in the resistance R1 may be controlled by a value in which the voltage of the non-inverting terminal(+) is divided by the resistance R1.

The current mirror circuit 157 is connected to a drain of the transistor 156, and a current of the transistor 156 is mirrored by the current source 158 through the current mirror circuit 157. In other words, a current I3 of the current source 158 is according to a voltage of the non-inverting terminal (+) of the operational amplifier 155.

One end of the capacitor C4 is connected to the current source 158, and the capacitor C4 is charged by the current I3 of the current source 158. The transistor 160 is connected to the capacitor C4 in parallel and switching-operated according to the inverted signal PWM by the inverter 159. For a period of time in which the transistor 160 is turned off, the capacitor C4 is charged by the current I3 and the voltage V3 is increased. In a case in which the transistor 160 is turned on, the capacitor C4 is discharged and the voltage V3 is reset to a ground level.

The switch 161 is connected between one end of the capacitor C4 and the buffer 162, and switching-operated according to the signal PWM. A capacitor C5 is connected to an output terminal of the buffer 162 and an input terminal of the buffer 163. The switch 164 is connected between an output terminal of the buffer 163 and one end of the capacitor C6, and switched by a signal UPT1. A switch 165 is connected between one end of the capacitor C6 and a voltage source 5V, and switching-operated by a signal TOSR.

The signal PWM and the signal TOS inverted by the inverter 166 is input to the logic gate 167, and the logic gate 167 generates a signal UPT1 by AND operating two inputs.

The comparator 168 generates output according to a result of comparing a voltage VTM and the voltage V3. In a case in which an input of the non-inverting terminal (+) is an input of the inverting terminal (−) or more, the comparator 168 may generate output in a high level. In the opposite case, the comparator 168 generates output in a low level. A voltage VTM is input into the non-inverting terminal (+), and the voltage V3 is input into the inverting terminal (−). An output of the comparator 168 is the maximum on-time signal TOM.

Figure 6:
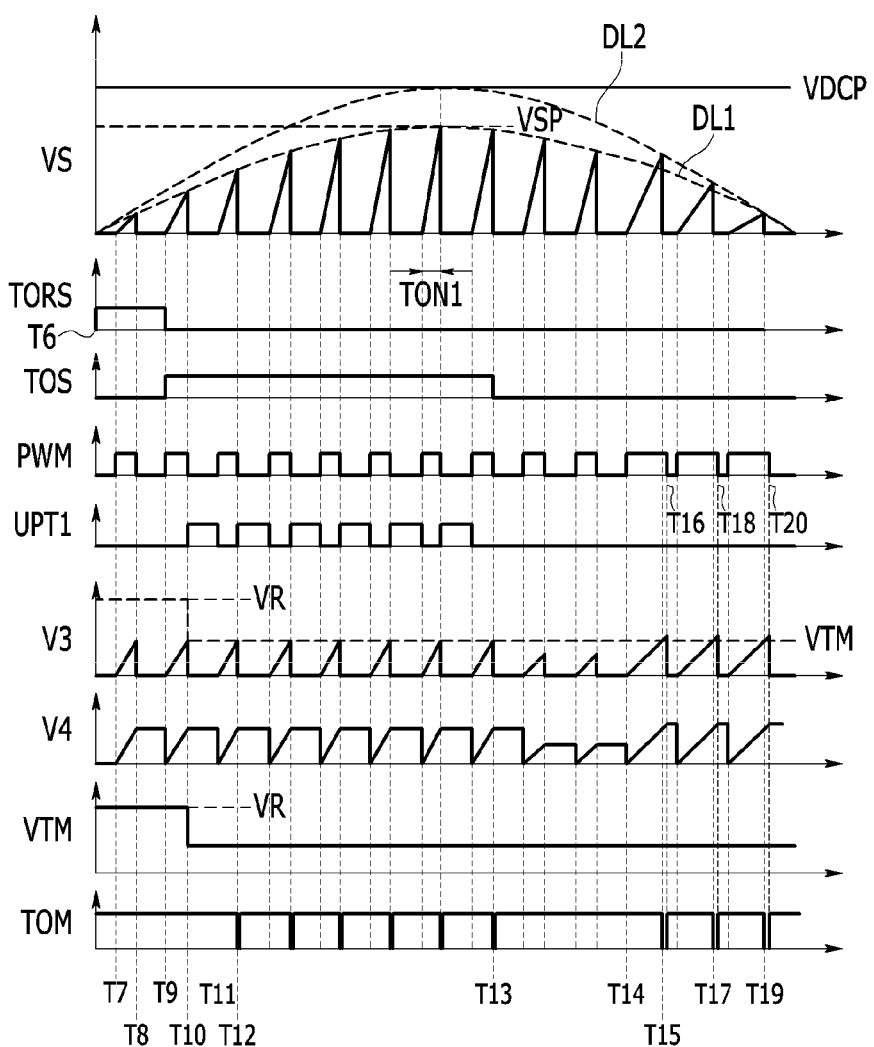
FIG. 6 is a waveform diagram illustrating signals of a maximum on-time calculating unit illustrated in FIG. 5.

FIG. 6 is a waveform diagram illustrating signals of the maximum on-time calculating unit illustrated in FIG. 5.

As described in FIG. 6, at a time T6, a signal TOSR is in a high level, the switch 165 is turned on, and the voltage VTM is initialized to 5V.

At a time T7, the signal PWM is increased in a high level, the transistor 160 is turned off, and the voltage V3 begins to increase by the current I3 according to the detection voltage peak VSP. The detection voltage peak VSP illustrated in FIG. 6 may be a value of an immediately preceding line period. The detection voltage peaks VSP in a period of time of adjacent immediately preceding lines may be substantially the same.

At a time T7, output of the comparator 168 is in a high level, a signal PWM is increased to a high level. At a time T8, the signal PWM is falling to a low level. For a period of time T7-T8, the transistor 160 is turned off by the inverted signal PWM, and the capacitor C4 is charged by the current I3, whereby the voltage V3 is increased. For a period of time T7-T8, the switch 161 is turned on by the signal PWM, and the capacitor C5 is charged by the voltage V3, whereby a voltage V4 is increased. After the switch 161 is turned off, the voltage V4 is maintained by the capacitor C5.

At a time T9, the signal TOS is increased to a high level, and the signal TOSR is falling to a low level. In this case, switches 154 and 165 are turned off, and the switch 152 is turned on. Thus, the current source 158 generates the current I3 according to the OCP voltage VDCP.

At a time T9, the signal PWM is also increased to a high level, and the logic gate 167 allows the signal UPT1 in a low level to be maintained. The switch 161 is turned on by the signal PWM, and the transistor 160 is turned off.

At a time T10, the signal PWM is falling to a low level, and the signal UPT1 is increased to a high level. In this case, the switch 161 is turned off by the signal PWM, the transistor 160 is turned on, and the switch 164 is turned on by the signal UPT1.

For a period of time T9-T10, the capacitor C5 is charged according to the voltage V3, and the voltage V4 is increased. At a time T10, in a case in which the switch 164 is turned on, the voltage V4 is sampled by the capacitor C6, and a level of the voltage VTM is changed according to the sampled voltage. At a time T10, the voltage V4 is substantially the same level as the voltage V3, and the voltage VTM is also changed into substantially the same level as the voltage V4.

At a time T11, the signal PWM is increased to a high level, and the signal UPT1 is falling to a low level. At a time T12, the signal PWM is falling to a low level, and the signal UPT1 is increased to a high level. For a period of time T11-T12, operations for the period of time T9-T10 are repeated.

For a high level period of time of the signal TOS, in other words, for a set period of time T9-T13, operations for the period of time T9-T10 are repeated. The set period of time may be set as a period of time including one period of at least the signal PWM, and may be set as a reasonable period of time required for accurately setting the voltage VTM. For example, the set period of time may include a peak time of the line input voltage.

For the set period of time T9-T13, the maximum on-time signal TOM is synchronized with a time (for example, a time T12) in which the voltage V3 reaches the voltage VTM and falling to a low level. Immediately after a reaching time, the voltage V3 is reset to a ground voltage, whereby the maximum on-time signal TOM is increased to a high level. In FIG. 6, it is illustrated that the maximum on-time signal TOM has a short pulse in a low level, but embodiments of the present invention is not limited thereto.

At a time T13, the signal TOS is falling to a low level. In this case, the switch 152 is turned off, and the switch 154 is turned on. Thus, the current source 158 generates the current I3 according to the detection voltage peak VSP. The logic gate 167 allows the signal UPT1 in a low level to be maintained after the time T13.

In a non-set period of time after the time T13, the maximum on-time of the power switch M may be determined according to the voltage VTM set for the set period of time T9-T13.

For example, at a time T14, the signal PWM is increased to a high level, and the voltage V3 begins to increase. In this case, the voltage V3 is increased with the current I3 according to the detection voltage peak VSP. At the time T15, the voltage V3 reaches the voltage VTM, and the maximum on-time signal TOM is falling to a low level. In this case, the duty control unit 33 is synchronized with a falling edge of the maximum on-time signal TOM and turns off the power switch M. The signal PWM is falling to a low level at a time T16 after the time T15, but the on-time of the power switch M may be controlled to the period of time T14-T15 by the maximum on-time signal TOM.

As described in FIG. 6, in succession, the signal PWM falls to a low level at a time T18 and a time T20, respectively, but the maximum on-time signal TOM falls to a low level at a time T17 and a time T19 in which the voltage V3 reaches the voltage VTM, respectively. Thus, the power switch M is turned off.

In FIG. 6, a dotted line DL1 connecting peaks of the sense voltage VS in a normal state, is illustrated. Even in a case in which an overload state occurs, as a peak of the switch current IS is limited by the maximum on-time signal TOM, a peak of the sense voltage VS out of the dotted line DL1 may be controlled according to a dotted line DL2.

For a set period of time T9-T13, the current I3 is a current according to the OCP voltage VDCP, the voltage VTM may be determined according to the OCP voltage VDCP and an on-time (for example, TON1) of the power switch M for the set period of time T9-T13. In the non-set period of time, for the on-time of the power switch M, the voltage V3 is increased according to the current I3 according to the detection voltage peak VSP, whereby the maximum on-time of the power switch M is according to VDCP*TON1/VSP.

The OCP voltage VDCP is a constant voltage, and the TON1 is constant in a normal state. Thus, the maximum on-time may be determined according to the detection voltage peak VSP. The detection voltage peak VSP is determined according to the line period peak, whereby the maximum on-time is adapted according to the line period peak. For example, as the detection voltage peak VSP is increased, the maximum on-time is decreased. Thus, as the line input voltage VIN is increased, the maximum on-time is decreased. In this case, in an overload state, in a case in which the maximum on-time is controlled according to the second embodiment, electric power transferred to a load may be uniformly controlled regardless of line input voltage.

Hereinafter, with reference to FIGS. 7 to 10, an example according to a third embodiment will be described.

The overcurrent protection circuit according to the second embodiment sets an overcurrent reference voltage for a set period of time in a normal state, but the third embodiment for a set period of time sets an overcurrent reference voltage for a period of time in which a peak of the switch current IS is a predetermined threshold value or greater. Hereinafter, a voltage corresponding to the predetermined threshold value is referred to as an overcurrent threshold voltage.

Figure 7:
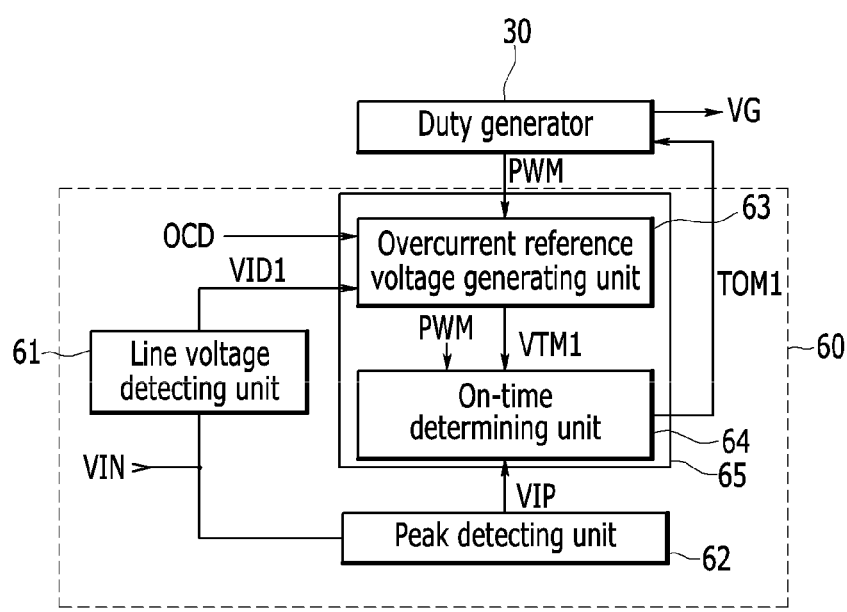
FIG. 7 is a block diagram illustrating an overcurrent protection circuit according to the third embodiment.

FIG. 7 is a block diagram illustrating an overcurrent protection circuit according to the third embodiment.

The overcurrent protection circuit 60 sets the overcurrent reference voltage VTM1 based on line input voltage VIN in a case in which the sense voltage VS corresponding to the switch current IS reaches the overcurrent threshold voltage VCP and an on-time of the power switch M, and controls a maximum on-time according to a time in which a voltage increased by a current according to the line period peak VIP reaches the overcurrent reference voltage VTM1.

The overcurrent threshold voltage VCP may be a voltage the same as the OCP voltage VDCP or may be set as a value in which a predetermined ratio (1/A) smaller than 1 is multiplied by the OCP voltage VDCP. In the second embodiment, the overcurrent reference voltage VTM is set by using a current according to the OCP voltage VDCP for a set period of time. However, in the third embodiment, in a case in which the sense voltage VS reaches the overcurrent threshold voltage VCP for a set period of time, the maximum on-time set operation is started, and the overcurrent reference voltage VTM may be set by using a current according to the line input voltage VIN.

The overcurrent protection circuit 60 sets the overcurrent reference voltage VTM1 for a period of time in which a peak of the sense voltage VS is the same as the overcurrent threshold voltage VCP. For example, as the on-time of the power switch M is increased by overload, a peak of the sense voltage VS may be increased. In a case in which the sense voltage VS reaches the overcurrent threshold voltage VCP, the power switch M is turned off, whereby a peak of the sense voltage VS may be limited to the overcurrent threshold voltage VCP. The overcurrent protection circuit 60 may set the overcurrent reference voltage VTM1 for a period of time (hereinafter, an overcurrent threshold period of time) in which a peak of the sense voltage VS is reached to the overcurrent threshold voltage VCP.

As described in FIG. 7, the overcurrent protection circuit 60 may include a line voltage detecting unit 61, a peak detecting unit 62, and a maximum on-time calculating unit 65. The maximum on-time calculating unit 65 may include an overcurrent reference voltage generating unit 63 and an on-time determining unit 64.

The line voltage detecting unit 61 generates the line detection voltage VID1 in which the line input voltage VIN is detected. The line detection voltage VID1 may be supplied to the overcurrent reference voltage generating unit 63. In addition, the line voltage detecting unit 61 may detect the line input voltage VIN at a time in which the sense voltage VS reaches the overcurrent threshold voltage VCP, and may supply the line input voltage VIN to the overcurrent reference voltage generating unit 63.

The peak detecting unit 62 receives the line input voltage VIN, and detects a peak of the line input voltage VIN by a line period unit. The line period peak VIP detected by the peak detecting unit 62 may be supplied to the on-time determining unit 54.

The overcurrent reference voltage generating unit 63 receives a signal OCD, a line detection voltage VID1, and a signal PWM, and generates the overcurrent reference voltage VTM1 by using the line detection voltage VID1 and the signal PWM for an overcurrent threshold period of time indicated by the signal OCD.

For example, the overcurrent reference voltage generating unit 63 may generate a voltage by using a current according to the line detection voltage VID1 at a time in which the signal OCD is enabled for an enable period of time of the signal PWM, sample a voltage generated as being synchronized at a disable time of the signal PWM, and generate the overcurrent reference voltage VTM1 based on the sampled voltage.

The on-time determining unit 64 receives the overcurrent reference voltage VTM1 and the line period peak VIP, and determines a time in which a voltage increased as a slope according to the line period peak VIP reaches the overcurrent reference voltage VTM1, as a maximum on-time. For example, the on-time determining unit 64 allows a voltage to be increased by using a current according to the line period peak VIP, and in a case in which the increased voltage reaches the overcurrent reference voltage VTM1, the on-time determining unit 64 allows the maximum on-time signal TOM1 to be changed.

The duty generator 30 generates the signal PWM, and generates a gate signal VG according to the signal PWM or the maximum on-time signal TOM1. A detailed description thereof is the same as the second embodiment, so it will be omitted.

Figure 8:
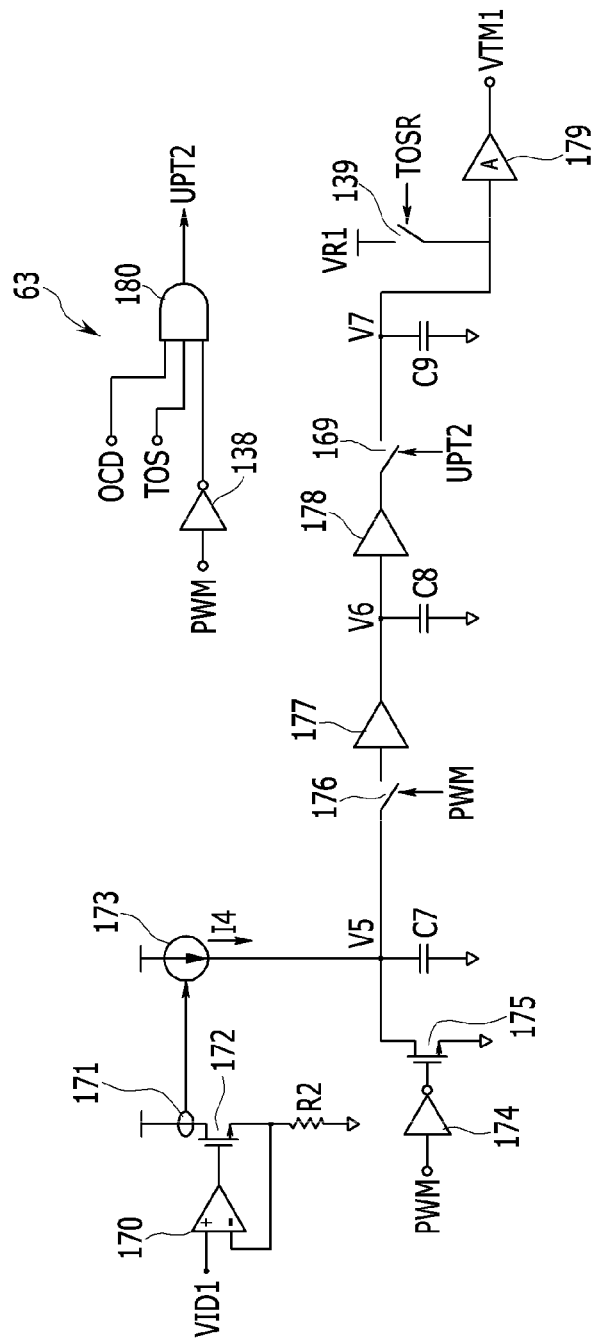
FIG. 8 is a drawing illustrating an overcurrent reference voltage generating unit according to the third embodiment.

FIG. 8 is a drawing illustrating an overcurrent reference voltage generating unit according to the third embodiment.

As described in FIG. 8, the overcurrent reference voltage generating unit 63 includes three switches 176, 169, and 139, two transistors 172 and 175, an operational amplifier 170, two inverters 174 and 138, a current mirror circuit 171, a current source 173, two buffers 177 and 178, three capacitors C7 to C9, a logic gate 180, a resistance R2, and a multiplier 179.

The line detection voltage VID1 may be input to the non-inverting terminal (+) of the operational amplifier 170. In addition, the line detection voltage VID1 at a time in which the sense voltage VS reaches the overcurrent threshold voltage VCP may be input into the non-inverting terminal (+) of the operational amplifier 170.

An output terminal of the operational amplifier 170 is connected to a gate of the transistor 172, and the inverting terminal (−) of the operational amplifier 170 is connected to one end of the resistance R2. The operational amplifier 170 generates output based on a difference between the voltage of the non-inverting terminal (+) and the voltage of the inverting terminal (−), thereby controlling the transistor 172 to allow the voltage of the non-inverting terminal (+) and the voltage of the inverting terminal (−) to be the same.

In a case in which a current flows through the transistor 172 and the resistance R2, one end voltage of the resistance R2 is determined according to the current flowing the resistance R2, and input to the inverting terminal (−) of the operational amplifier 170. The operational amplifier 170 generates output according to a difference between the voltage of the non-inverting terminal (+) and the voltage of the inverting terminal (−). Thus, in a case in which the difference between two voltages is increased, the output thereof is increased, a current flowing in the resistance R2 is increased, and the voltage of the inverting terminal (−) is increased.

In the opposite case, the difference between two voltages is decreased, output thereof is decreased, a current flowing in the resistance R2 is decreased, and the voltage of the inverting terminal (−) is decreased.

As described above, the voltage of the inverting terminal (−) is according to the voltage of the non-inverting terminal (+) by the operational amplifier 170, and the current flowing in the resistance R2 is controlled by a value in which the voltage VID1 of the non-inverting terminal (+) is divided by the resistance R2.

The current mirror circuit 171 is connected to a drain of the transistor 172, and the current of the transistor 172 is mirrored by the current source 173 through the current mirror circuit 171. In other words, the current I4 of the current source 173 is according to the voltage of the non-inverting terminal (+) of the operational amplifier 170.

One end of the capacitor C7 is connected to the current source 173 and the capacitor C7 may be charged by the current I4 of the current source 173. The transistor 175 is connected to the capacitor C7 in parallel, and switching-operated according to the inverted signal PWM by the inverter 174. For a period of time in which the transistor 175 is turned off, the capacitor C7 is charged by the current I4, and the voltage V5 is increased. In a case in which the transistor 175 is turned on, the capacitor C7 is discharged, whereby the voltage V5 is reset to a ground level.

A switch 176 is connected to between one end of the capacitor C7 and the buffer 177 and switching-operated according to the signal PWM. The capacitor C8 is connected to an output terminal of the buffer 177 and an input terminal of the buffer 178. The switch 169 is connected between an output terminal of the buffer 178 and one end of the capacitor C9, and switched by a signal UPT2. The switch 139 is connected between one end of the capacitor C9 and the voltage source VR1, and switching-operated by the signal TOSR.

The signal PWM, the signal TOS, and the signal OCD inverted by the inverter 138 are input into the logic gate 180, and the logic gate 180 generates the signal UPT2 by AND operating three inputs.

The signal TOS is a signal indicating a predetermined set period of time for calculating a maximum on-time. The signal TOS may be synchronized with the signal OCD, thereby controlling an enable period of time of the signal TOS. In this case, the logic gate 180 may generate the signal UPT2 by AND operated the signal PWM and the signal OCD which are inverted.

The switch 139 is connected between one end of the capacitor C9 and the voltage source VR1, and switching-operated by the signal TOSR.

The multiplier 179 generates the overcurrent reference voltage VTM1 by multiplying the voltage V7 by a ratio A. The ratio A may be a value in which the OCP voltage VDCP is divided by the overcurrent threshold voltage VCP, and 1 or more.

Figure 9:
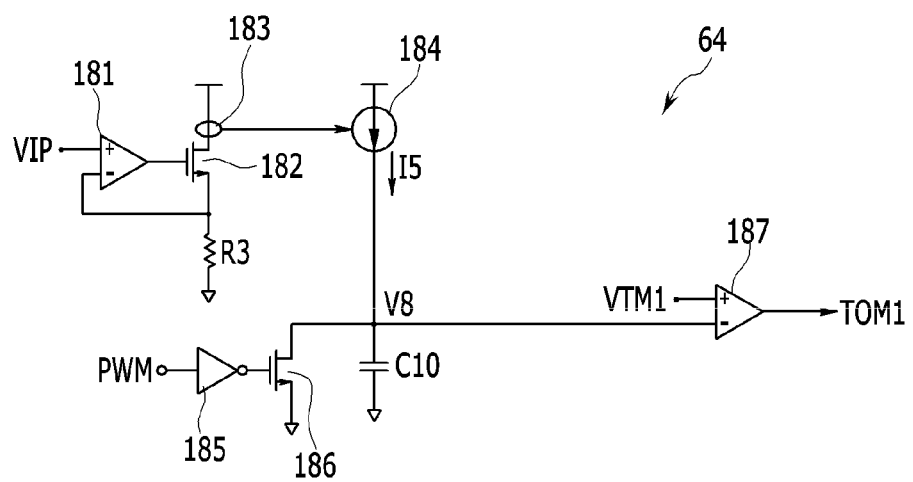
FIG. 9 is a drawing illustrating an on-time determining unit according to the third embodiment.

FIG. 9 is a drawing illustrating an on-time determining unit according to the third embodiment.

As described in FIG. 9, the on-time determining unit 64 includes two transistors 182 and 186, an operational amplifier 181, an inverter 185, a current mirror circuit 183, a current source 184, a capacitor C10, a resistance R3, and a comparator 187.

The line period peak VIP is input to the non-inverting terminal (+) of the operational amplifier 181, an output terminal of the operational amplifier 181 is connected to a gate of the transistor 172, and the inverting terminal (−) of the operational amplifier 181 is connected to one end of the resistance R3. The operational amplifier 181 generates output based on a difference between a voltage of the non-inverting terminal (+) and a voltage of the inverting terminal (−), thereby controlling a transistor 182 to allow the voltage of the non-inverting terminal (+) and the voltage of the inverting terminal (−) to be the same.

In a case in which a current flows through the transistor 182 and the resistance R3, one end voltage of the resistance R3 is determined according to the current flowing the resistance R3 and input to the inverting terminal (−) of the operational amplifier 181. The operational amplifier 181 generates output according to a difference between the voltage of the non-inverting terminal (+) and the voltage of the inverting terminal (−). Thus, in a case in which the difference between two voltages is increased, the output thereof is increased, the current flowing in the resistance R3 is increased, and a voltage of the inverting terminal (−) is increased.

In the opposite case, in a case in which the difference between two voltages is decreased, the output thereof is decreased, the current flowing in the resistance R3 is decreased, and the voltage of the inverting terminal (−) is decreased.

As described above, the voltage of the inverting terminal (−) is according to the voltage of the non-inverting terminal (+) by the operational amplifier 181, and the current flowing in the resistance R3 is controlled by a value in which a voltage VIP of the non-inverting terminal (+) is divided by the resistance R3.

The current mirror circuit 183 is connected to a drain of the transistor 182, and a current of the transistor 182 is mirrored by the current source 184 through the current mirror circuit 183. In other words, a current I5 of the current source 184 is according to the voltage of the non-inverting terminal (+) of the operational amplifier 181.

One end of the capacitor C10 is connected to the current source 184, and the capacitor C10 may be charged by the current I5 of the current source 184. A transistor 186 is connected to the capacitor C10 in parallel, and switching-operated according to the signal PWM inverted by the inverter 185. For a period of time in which the transistor 186 is turned off, the capacitor C10 is charged by the current I5, and the voltage V8 is increased. In a case in which the transistor 186 is turned on, the capacitor C10 is discharged, whereby the voltage V8 is reset to a ground level.

The comparator 187 generates output according to a result of comparing the voltage VTM1 and the voltage V8. The comparator 187 generates output in a high level in a case in which an input of the non-inverting terminal (+) is an input of the inverting terminal (−) or more. In the opposite case, the comparator 187 generates output in a low level. The voltage VTM1 is input into the non-inverting terminal (+), and the voltage V8 is input into the inverting terminal (−). Output of the comparator 187 is the maximum on-time signal TOM1.

Figure 10:
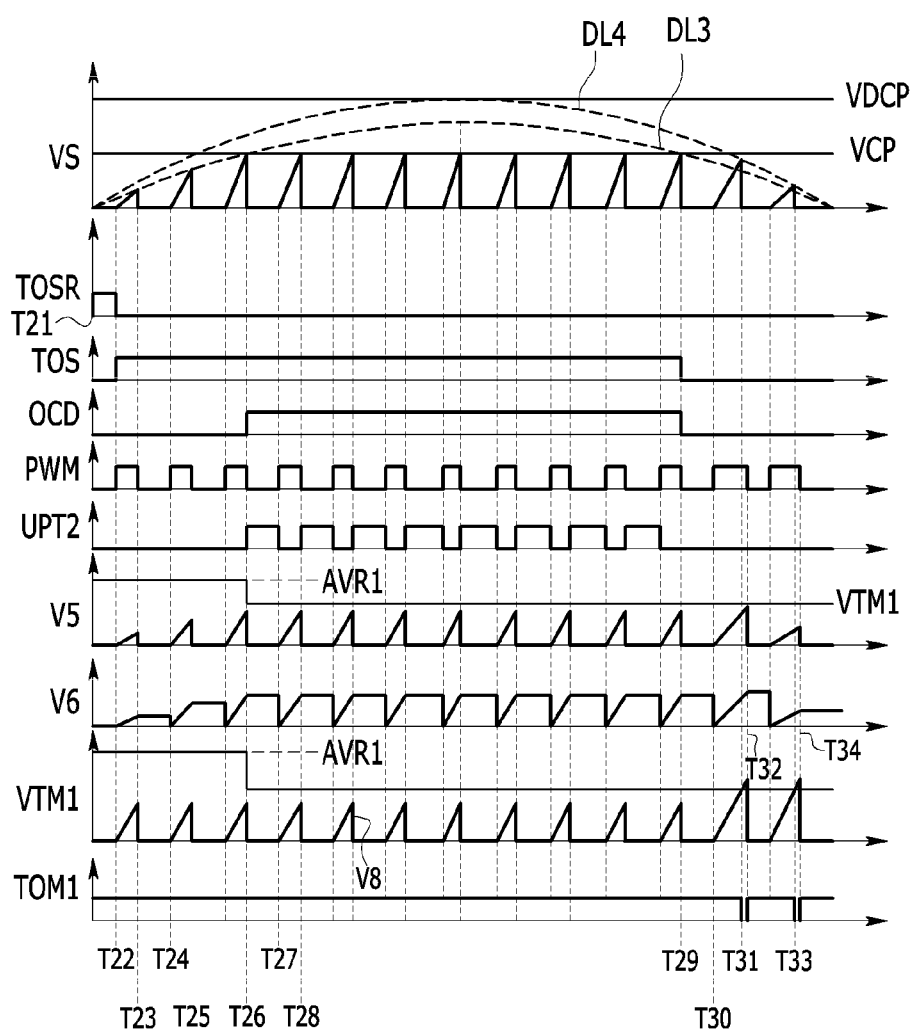
FIG. 10 is a waveform diagram for describing overcurrent protection circuit operations according to the third embodiment.

FIG. 10 is a waveform diagram for describing overcurrent protection circuit operations according to the third embodiment.

At a time T21, a signal TOSR is increased to a high level. In a case in which the switch 139 is turned on, the voltage V7 is set as a voltage of the voltage source VR1, and an overcurrent reference voltage VTM1 is initialized by a voltage of A*VR1.

At a time T22, the signal TOSR is falling to a low level, the signal TOS is increased to a high level, and the signal PWM is increased to a high level. At a time T23, the signal PWM is falling to a low level.

For a period of time T22-T23, the voltage V5 is increased by the current I4 according to the line detection voltage VID1, and the voltage V6 is increased according to the voltage V5. At a time T24, the signal PWM is increased to a high level, and at a time T25, the signal PWM is falling to a low level. For a period of time T23-T24, the voltage V6 is uniformly maintained. For a period of time T24-T25, the voltage V5 is increased by the current I4 according to the line detection voltage VID1, and the voltage V6 is increased according to the voltage V5.

At a time T26, the sense voltage VS reaches the overcurrent threshold voltage VCP, and the signal OCD is increased to a high level. At a time T26, the signal PWM is falling to a low level, the signal UPT2 is in a high level, and the switch 169 is turned on. The voltage V7 is determined according to the voltage V6, and the overcurrent reference voltage VTM1 is determined according to the voltage V7. In FIG. 10, it is illustrated that the overcurrent reference voltage VTM1 is falling, but embodiments of the present invention are not limited thereto.

At a time T27, the signal PWM is increased to a high level, and the signal UPT2 is falling to a low level. At a time T28, the signal PWM is falling to a low level, and the signal UPT2 is increased to a high level. At a time T28, the transistor 186 is synchronized with a falling edge of the signal PWM and turned on, whereby the voltage V8 is reset to a ground level. Thus, as described in FIG. 10, the voltage V8 does not reach the overcurrent reference voltage VTM1, and the maximum on-time signal TOM1 is maintained to be a high level.

For a period of time T27-T28, the voltage V5 is increased with the current I4 according to the line detection voltage VID1, and the voltage V6 is increased according to the voltage V5. At the time T28, the switch 169 is turned on, whereby the voltage V7 is determined according to the voltage V6, and the overcurrent reference voltage VTM1 is determined according to the voltage V7.

After a time T29, a peak of the sense voltage VS is smaller than the overcurrent threshold voltage VCP. For a period of time T26-T29 in which the signal OCD is in a high level, the above described operations are repeated, whereby the overcurrent reference voltage VTM1 is determined.

In FIG. 10, for a period of time T26-T29, it is illustrated that the overcurrent reference voltage VTM1 is uniformly maintained, but for the period of time T26-T29, there may be a variation in the overcurrent reference voltage VTM1.

The maximum on-time after the time T29 is a period of time from a time in which the signal PWM is increased to a high level, and to a time in which the maximum on-time signal TOM1 is falling to a low level. Thus, in a case in which a falling edge time of the signal PWM occurs later than a falling edge of the maximum on-time signal TOM1, an on-time of the power switch M may be limited to a falling edge time of the maximum on-time signal TOM1.

For example, at a time T31, the signal PWM is increased to a high level, and the voltage V8 begins to increase. At the time T31, the voltage V8 reaches the voltage VTM1, and the maximum on-time signal TOM1 falls to a low level. In this case, the duty generator 30 is synchronized with a falling edge of the maximum on-time signal TOM1 and turns off the power switch M. The signal PWM falls to a low level at a time T32 after the time T31, but the on-time of the power switch M may be controlled to the period of time T30-T31 by the maximum on-time signal TOM1.

As described in FIG. 6, in succession, the signal PWM falls to a low level at a time T34, but the maximum on-time signal TOM1 falls to a low level at a time T33 in which the voltage V8 reaches the voltage VTM1, and the power switch M is turned off.

In FIG. 10, a dotted line DL3 connecting peaks of the sense voltage VS in a normal state, is illustrated. Even in a case in which an overload state occurs, as a peak of the switch current IS is limited by the maximum on-time signal TOM1, a peak of the sense voltage VS out of the dotted line DL3 may be controlled according to a dotted line DL4.

Thus, when the peak of the dotted line DL4 is equal to the OCP voltage VDCP, a falling edge of the maximum on-time signal TOM1 is generated.

Even in a case in which a peak of the sense voltage VS reaches the overcurrent threshold voltage VCP, when the signal TOS is not in a high level, a peak of the sense voltage VS may be controlled according to the line input voltage VIN like a dotted line DL3. In other words, in a case of not being in a set period of time of the maximum on-time, the maximum on-time is not set by using the overcurrent threshold voltage VCP.

Before an overcurrent condition occurs, the overcurrent reference voltage VTM1 for setting the maximum on-time is required to be determined. For example, in a case in which the maximum on-time is required to be controlled, the signal TOS is in a high level for a predetermined period of time. Thus, in a case in which the sense voltage VS reaches the overcurrent threshold voltage VCP lower than the OCP voltage VDCP, the maximum on-time may be set.

As described above, the maximum on-time is set based on the overcurrent reference voltage VTM1 set as the voltage V7 is amplified by the ratio A. Thus, it is the same as that the maximum on-time is set based on the OCP voltage VDCP. In this case, the maximum on-time may be set in advance before the sense voltage VS reaches the OCP voltage VDCP, thereby preventing a damage caused by overcurrent in advance.

The enable period of time (a high level period of time) of the signal TOSR and the signal TOS illustrated in FIG. 10 are an example, but embodiments of the present invention are not limited thereto. It is synchronized with the signal OCD, thereby determining the signal TOS and the signal TOSR.

In the third embodiment, a configuration detecting the line input voltage VIN in real time is required. In the fourth embodiment, a configuration detects only a peak of the line input voltage VIN.

Hereinafter, with respect to FIGS. 11 to 13, a fourth embodiment will be described.

Figure 11:
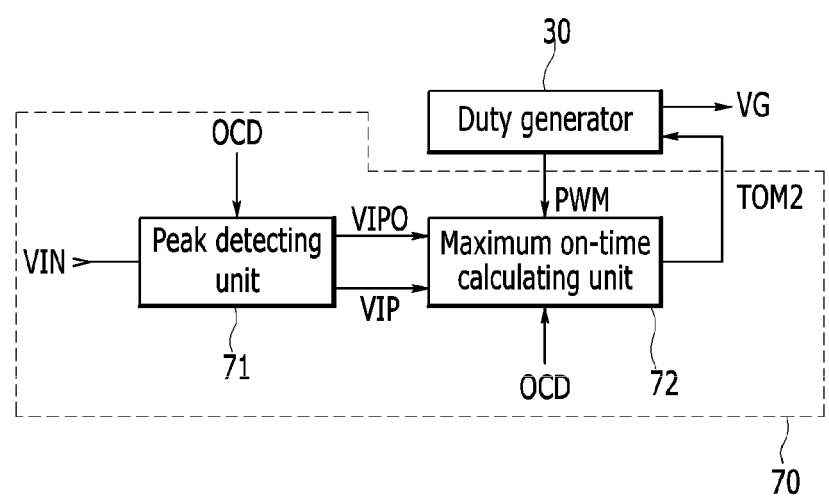
FIG. 11 is a drawing illustrating an overcurrent protection circuit according to the fourth embodiment.

FIG. 11 is a drawing illustrating an overcurrent protection circuit according to the fourth embodiment.

The overcurrent protection circuit 70 sets the overcurrent reference voltage VTM2 based on the line period peak VIPO when the sense voltage VS corresponding to the switch current IS reaches the overcurrent threshold voltage VCP and the on-time of the power switch M, and controls the maximum on-time according to the time in which the voltage increased by the current according to the line period peak VIP reaches the overcurrent reference voltage VTM2.

In the third embodiment, to set the overcurrent reference voltage VTM1, the line input voltage VIN is detected in real time. In the fourth embodiment, only a line period peak is detected by a line period unit. Like the third embodiment, the overcurrent protection circuit 70 sets the overcurrent reference voltage VTM2 for a period of time in which a peak of the sense voltage VS is the same as the overcurrent threshold voltage VCP, for a predetermined set period of time.

As described in FIG. 11, the overcurrent protection circuit 70 includes a peak detecting unit 71 and a maximum on-time calculating unit 72.

The peak detecting unit 71 detects a peak of the line input voltage VIN by the line period unit, and supplies the detected line period peak VIP to the maximum on-time calculating unit 72. In addition, the peak detecting unit 71 may supple the line period peak VIPO at a time in which the sense voltage VS reaches the overcurrent threshold voltage VCP to the maximum on-time calculating unit 72. For example, the peak detecting unit 71 may supply the line period peak VIP of the increased edge of the signal OCD as the line period peak VIPO, to the maximum on-time calculating unit 72 for the high level period of time of the signal OCD.

The maximum on-time calculating unit 72 receives line period peaks VIP and VIPO, a signal OCD, and a signal PWM, and generates the overcurrent reference voltage VTM2 using the line period peak VIPO and the signal PWM for the overcurrent threshold period of time indicated by the signal OCD. The maximum on-time calculating unit 72 determines when the voltage increased by a slope according to the line period peak VIP reaches the overcurrent reference voltage VTM1 after the overcurrent threshold period of time ends, as the maximum on-time.

The maximum on-time calculating unit 72 may transfer a maximum on-time signal TOM2 corresponding to the determined maximum on-time to the duty generator 30. For example, the maximum on-time calculating unit 72 allows the voltage to be increased using the current according to the line period peak VIP, and allows the maximum on-time signal TOM2 when the increased voltage reaches the overcurrent reference voltage VTM2 to be changed.

The duty generator 30 generates the signal PWM, and generates the gate signal VG according to the signal PWM or the maximum on-time signal TOM2. A detailed description is omitted since it is the same as that of in the second embodiment.

Figure 12:
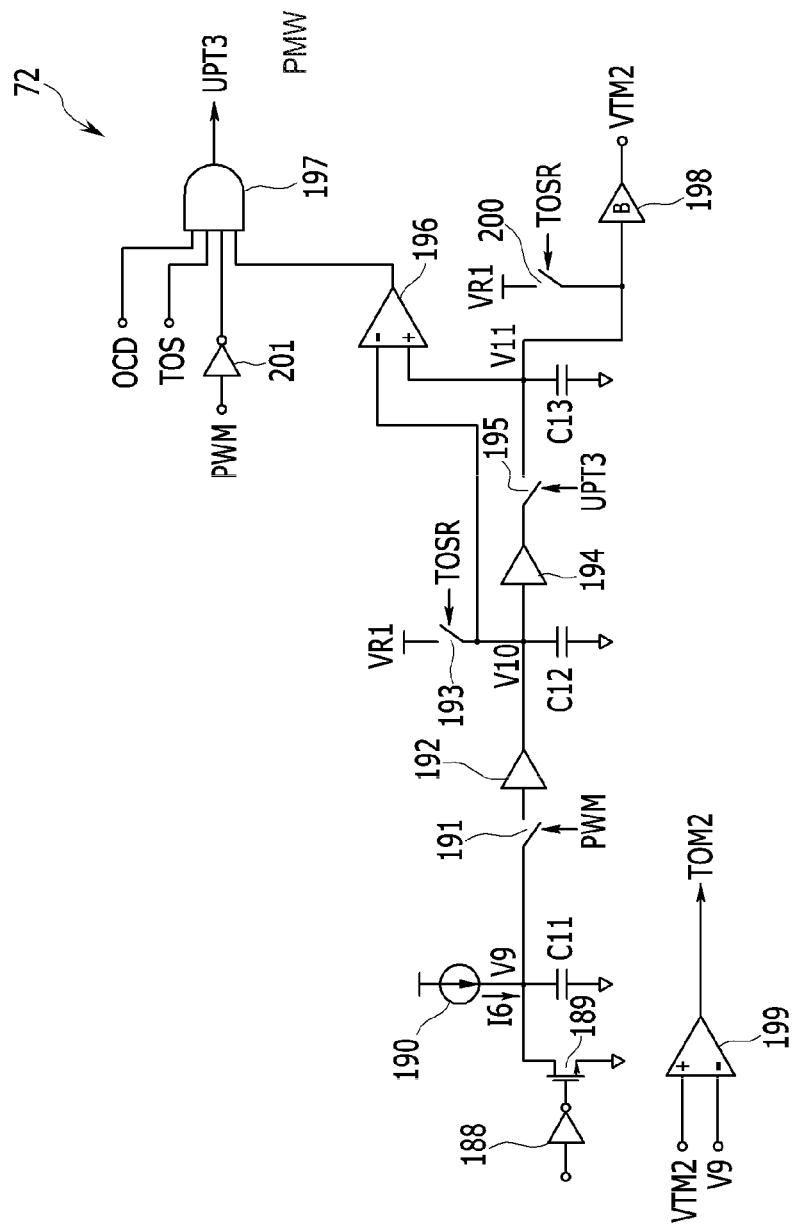
FIG. 12 is a drawing illustrating a configuration of a maximum on-time calculating unit according to the fourth embodiment.

FIG. 12 is a drawing illustrating a configuration of a maximum on-time calculating unit according to the fourth embodiment.

As described in FIG. 12, the maximum on-time calculating unit 72 includes four switches 191, 193, 195, and 200, a transistor 189, two inverters 188 and 201, a current source 190, two buffers 192 and 194, three capacitors C11 to C13, a logic gate 197, two comparators 196 and 199, and a multiplier 198.

The current source 190 generates a current I6 according to the line period peak VIPO for the overcurrent threshold period of time, and generates a current I6 according to the line period peak VIP for another period of time.

The line period peak may be changed by a line period unit, and line period peak values between two line periods which are substantially adjacent to each other may be the same. In addition, the overcurrent threshold period of time may be a period of time included within one line period. Even in a case in which the current source 190 generates the current I6 according to the line period peak VIP, but a function described in the preceding paragraph may be provided.

One end of the capacitor C11 is connected to the current source 190, and the capacitor C11 may be charged by the current I6 of the current source 190. The transistor 189 is connected to the capacitor C11 in parallel and switching-operated according to the signal PWM inverted by the inverter 188. For a period of time in which the transistor 189 is turned off, the capacitor C11 is charged by the current I6, and the voltage V9 is increased. In a case in which the transistor 189 is turned on, the capacitor C11 is discharged and the voltage V9 reset to a ground level.

The switch 191 is connected between one end of the capacitor C11 and the buffer 192 and switching-operated according to the signal PWM. The capacitor C12 is connected to an output terminal of the buffer 192 and an input terminal of the buffer 194. The switch 195 is connected between the output terminal of the buffer 194 and one end of the capacitor C13 and switching-operated according to the signal UPT3. The switch 193 is connected between one end of the capacitor C12 and the voltage source VR1 and switching-operated according to the signal TOSR. The switch 200 is connected between one end of the capacitor C13 and the voltage source VR1 and switching-operated according to the signal TOSR.

The comparator 196 determines output according to a result of comparing a voltage V10 and a voltage V11. The voltage V10 is input into the inverting terminal (−) of the comparator 196, and the voltage V11 is input into the non-inverting terminal (+) thereof. The comparator 196 outputs a high level in a case in which an input of the non-inverting terminal (+) is an input of the inverting terminal (−) or greater. Otherwise, the comparator 196 outputs a low level.

The signal PWM inverted by the inverter 201, output of the comparator 196, the signal TOS, and the signal OCD are input into the logic gate 197, and the logic gate 197 generates the signal UPT3 by AND operating four inputs.

The multiplier 198 generates the overcurrent reference voltage VTM2 by multiplying the voltage V11 by a ratio B. The ratio B may be a value in which the OCP voltage VDCP is divided by the overcurrent threshold voltage VCP, and 1 or more.

The comparator 199 generates the maximum on-time signal TOM2 according to a result of comparing the overcurrent reference voltage VTM2 and the voltage V9. The voltage V9 is input into the inverting terminal (−) of the comparator 199, and the overcurrent reference voltage VTM2 is input into the non-inverting terminal (+). The comparator 199 outputs a high level in a case in which an input of the non-inverting terminal (+) is an input of the inverting terminal (−) or more. Otherwise, the comparator 199 outputs a low level.

Figure 13:
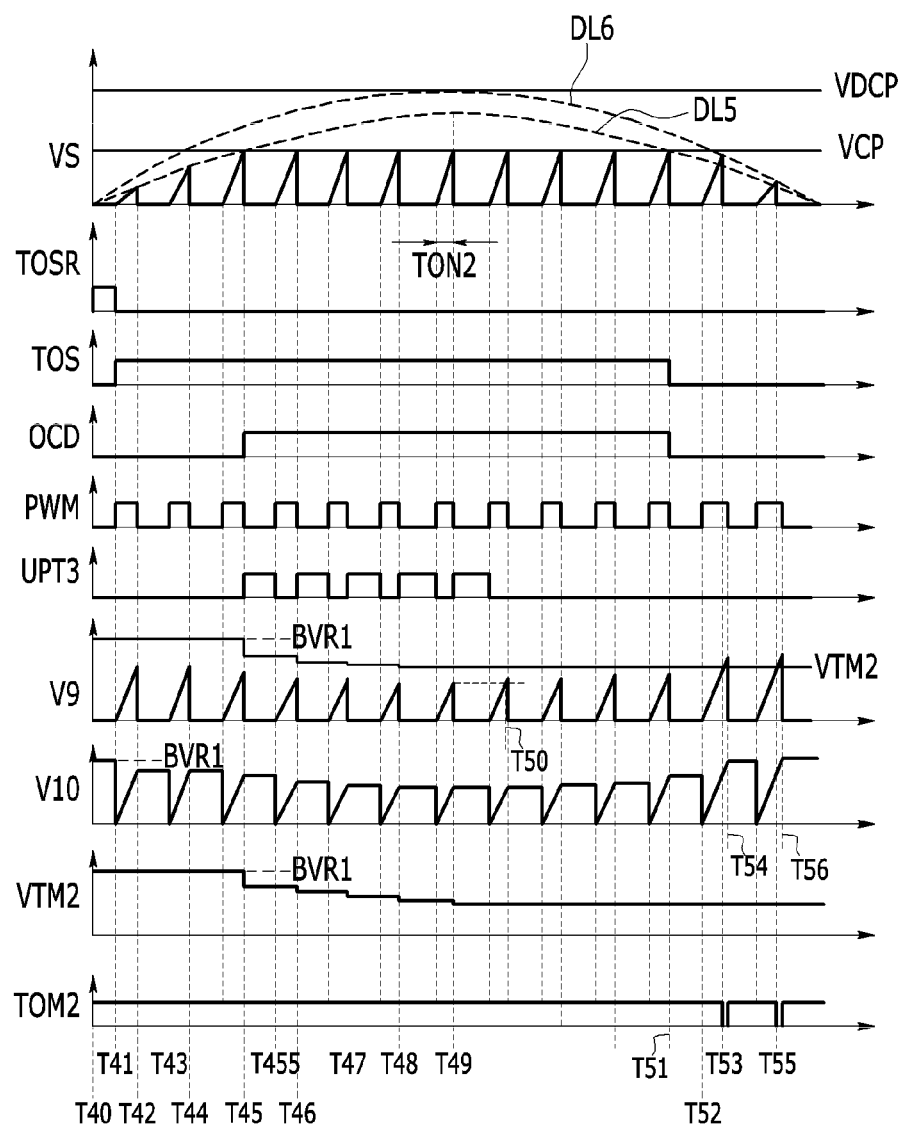
FIG. 13 is a waveform diagram for describing overcurrent protection circuit operations according to the fourth embodiment.

FIG. 13 is a waveform diagram for illustrating overcurrent protection circuit operations according to the fourth embodiment.

At a time T40, in a case in which the signal TOSR is increased to a high level and switches 193 and 200 are turned on, a voltage V10 and a voltage V11 are set to a voltage of the voltage source VR1, and the overcurrent reference voltage VTM2 is initialized to a voltage of B*VR1.

At a time T41, the signal TOSR is falling to a low level, the signal TOS is increased to a high level, and the signal PWM is increased to a high level. At a time T42, the signal PWM is falling to a low level.

For a period of time T41-T42, the voltage V9 is increased by the current I6 according to the line period peak VIP, and the voltage V10 is increased according to the voltage V9. At a time T43, the signal PWM is increased to a high level. At a time T44, the signal PWM is falling to a low level. For a period of time T42-T43, the voltage V10 is uniformly maintained. For period of time T43-T44, the voltage V9 is increased by the current I6 according to the line period peak VIP, and the voltage V10 is increased according to the voltage V9.

At a time T45, as the sense voltage VS reaches the overcurrent threshold voltage VCP, the signal OCD is increased to a high level. At a time T45, as the signal PWM is falling to a low level, the signal UPT3 is in a high level and the switch 195 is turned on. The voltage V11 is determined according to the voltage V10, and the overcurrent reference voltage VTM2 is determined according to the voltage V11.

At a time T455, the signal PWM is increased to a high level, and the signal UPT3 is falling to a low level. At a time T46, in a case in which the signal PWM is falling to a low level, as output of the comparator 196, the signal TOS, and the signal OCD are in a high level, the signal UPT3 is increased to a high level.

For a period of time T455-T46, the voltage V9 is increased with the current I6 according to the line period peak VIOP, and the voltage V10 is increased according to the voltage V9. At a time T46, the switch 195 is turned on, the voltage V11 is determined according to the voltage V10, and the overcurrent reference voltage VTM2 is determined according to the voltage V11.

In such a manner, for each time T47, T48, and T49, the overcurrent reference voltage VTM2 is determined. In FIG. 13, it is illustrated that the overcurrent reference voltage VTM2 is decreased by stages for a period of time T45-T49, and uniformly maintained after a time T49, but embodiments of the present invention are not limited thereto.

In a case in which the voltage V10 is gradually reduced not to exceed the voltage V11, output of the comparator 196 is a high level, therefore, the signal UPT3 is not changed according to the output of the comparator 196. However, when the voltage V10 exceeds the voltage V11 for a high level period of time of the signal PWM at a time T50, output of the comparator 196 is decreased to a low level at the time T50, and the signal UPT3 is in a low level. In FIG. 13, after the time T50 of the overcurrent threshold period of time, a peak of the voltage V10 is higher than the voltage V11, therefore the overcurrent reference voltage VTM2 is shown to be constant after the time T50.

In other words, the overcurrent reference voltage VTM2 is determined according to the shortest on-time TON2 for the overcurrent threshold period of time.

During a period T40-T51, as the voltage V9 does not reach the overcurrent reference voltage VTM2, the maximum on-time signal TOM2 is maintained to be a high level.

After the time T50, output of the comparator 196 is in a low level, therefore after the time T50, the signal UPT3 is not increased to a high level.

After the time T51, a peak of the sense voltage VS is smaller than the overcurrent threshold voltage VCP, therefore the signal OCD is in a low level. The maximum on-time after the time T51 is a period of time from a time in which the signal PWM is increased to a high level, to a time in which the maximum on-time signal TOM2 is falling to a low level.

At a time T52, the signal PWM is increased to a high level and the power switch is turned on. At a time T53, the voltage V9 reaches the overcurrent reference voltage VTM2, the maximum on-time signal TOM2 is falling to a low level, and the power switch M is turned off at a time T53. As described above, in a case in which a falling edge time T54 of the signal PWM occurs later than a falling edge time T53 of the maximum on-time signal TOM2, an on-time of the power switch M is limited to a period from the time T52 to falling edge time T53 of the maximum on-time signal TOM2.

As described in FIG. 13, in succession, the signal PWM falls to a low level at a time T56, but the maximum on-time signal TOM2 falls to a low level at a time T55 in which the voltage V9 reaches the voltage VTM2, and the power switch M is turned off.

In FIG. 13, a dotted line DL5 connecting peaks of the sense voltage VS in a normal state, is illustrated. Even in a case in which an overload state occurs, as a peak of the switch current IS is limited by the maximum on-time signal TOM2, a peak of the sense voltage VS out of the dotted line DL5 may be controlled according to a dotted line DL6.

Thus, when the peak of the dotted line DL6 is equal to the OCP voltage VDCP, a falling edge of the maximum on-time signal TOM2 is generated.

Even in a case in which a peak of the sense voltage VS reaches the overcurrent threshold voltage VCP, when the signal TOS is not in a high level, a peak of the sense voltage VS may be controlled according to the line input voltage VIN like a dotted line DL5. In other words, in a case in which it is not a set period of time of the maximum on-time, the maximum on-time is not set by using the overcurrent threshold voltage VCP.

Thus, all of the embodiments control a peak of a switch current to follow a sine wave synchronized to the form or the zero crossing point of the line input voltage on an overcurrent condition.

All the embodiments control a maximum peak of a switch current to be a constant value corresponding to the OCP voltage of an overcurrent condition regardless of the line input voltage.

An overcurrent condition means a condition where the peak of a switch is higher than a peak of a switch current in a normal state and less than a value of a switch current corresponding to the OCP voltage.

A description the same as the third embodiment described above is omitted.

From the above, a plurality of embodiments are described in detail, but the scope of the present invention is not limited thereto. A plurality of variations and modifications in the art using the basic idea of the present invention defined in the following claims belong to the scope of the invention.

What is claimed is:

1. A power factor correction circuit comprising:
   a switch converting a line input voltage into output power; and
   an overcurrent protection circuit limiting current of the switch during an overcurrent condition,
   wherein the overcurrent protection circuit is configured to control a peak of the current of the switch to follow a sine wave in synchronization with the line input voltage during the overcurrent condition.

2. The power factor correction circuit of claim 1, wherein the overcurrent protection circuit includes:
   a first current source generating a first current according to a line period peak which is a period unit peak of the line input voltage;
   a second current source generating a second current according to a line detection voltage corresponding to the line input voltage;
   a comparator determining whether a first voltage increased by the first current source reaches an overcurrent protection threshold voltage; and
   a capacitor receiving the second current according to an output of the comparator, and
   the overcurrent protection circuit is synchronized with the output of the comparator and samples a voltage of the capacitor, thereby generating a regular overcurrent protection reference.

3. The power factor correction circuit of claim 2, wherein the overcurrent protection circuit further includes:
   a first capacitor including one end coupled to the first current source; and
   a transistor coupled to the first capacitor in parallel, and the transistor is switching-operated according to a clock signal having a predetermined period.

4. The power factor correction circuit of claim 2, wherein the overcurrent protection circuit further includes:
a first transistor coupled between the second current source and the capacitor; and
a second transistor coupled to the capacitor in parallel, and
the first transistor is switching-operated according to the output of the comparator.

5. The power factor correction circuit of claim 2, wherein the overcurrent protection circuit resets the first voltage according to a clock signal having a predetermined period, and samples a voltage of the capacitor according to the clock signal and a signal generated based on the output of the comparator.

6. The power factor correction circuit according to claim 1, wherein the overcurrent protection circuit includes:
a peak detecting unit detecting a line period peak which is a line period unit peak of the line input voltage; and
a maximum on-time calculating unit setting an overcurrent reference voltage corresponding to an overcurrent reference for an overcurrent threshold period of time using a line period peak in a case in which a peak of the switch current is the same as a threshold value, and a PWM signal controlling switching operations of the switch, and calculating the maximum on-time according to a result of comparing a voltage generated based on the line period peak and the PWM signal and the overcurrent reference voltage, and
the overcurrent threshold period of time is a period of time in which the peak of the switch current is reached to the threshold value.

7. The power factor correction circuit according to claim 6, wherein the maximum on-time calculating unit includes:
a current source generating a first current according to the line period peak for the overcurrent threshold period of time; and
a capacitor coupled to the current source, and
the maximum on-time calculating unit generates a first voltage by supplying the first current to the capacitor for a period of time according to the PWM signal, samples the first voltage, and generates the overcurrent reference voltage based on a minimum voltage of a voltage sampled for the overcurrent threshold period of time.

8. The power factor correction circuit according to claim 7, wherein the maximum on-time calculating unit further includes:
a comparator comparing the first voltage and the sampled voltage; and
a logic gate controlling sampling operations according to the PWM signal and output of the comparator, and
in a case in which the first voltage is the sampled voltage or more, the logic gate disables the sampling operations according to the comparator output.

9. The power factor correction circuit according to claim 8, wherein the maximum on-time calculating unit further includes:
a first capacitor charged by the first voltage through a first switch switching-operated according to the PWM signal; and
a second capacitor charged by a voltage of the first capacitor through a second switch switching-operated according to output of the logic gate, and
the comparator has a first input terminal coupled to one end of the first capacitor, and the comparator has a second input terminal coupled to one end of the second capacitor.

10. The power factor correction circuit according to claim 7, wherein the maximum on-time calculating unit further includes a transistor coupled to the capacitor in parallel and switching-operated according to a signal in which the PWM signal is inverted, and
a sampling period of the first voltage is synchronized with the PWM signal.

11. The power factor correction circuit according to claim 7, wherein the maximum on-time calculating unit generates the overcurrent reference voltage by multiplying the sampled voltage by a first ratio, and
the first ratio is a ratio of an overcurrent threshold voltage corresponding to the threshold value with respect to a predetermined overcurrent protection threshold voltage.

12. The power factor correction circuit according to claim 6, wherein the maximum on-time calculating unit includes:
a current source generating a second current according to the line period peak after the overcurrent threshold period of time;
a capacitor coupled to the current source; and
a comparator comparing a voltage of the capacitor and the overcurrent reference voltage, and
the maximum on-time is determined according to output of the comparator.

13. The power factor correction circuit of claim 1, wherein the overcurrent protection circuit is configured to control a peak of the sine wave to be constant by controlling a maximum on-time of the switch.

14. The power factor correction circuit of claim 13, wherein the overcurrent protection circuit includes:
a peak detecting unit generating a detection voltage peak corresponding to the peak of the switch current by a line period unit of the line input voltage; and
a maximum on-time calculating unit setting an overcurrent reference voltage corresponding to an overcurrent reference using a predetermined overcurrent protection threshold voltage and a PWM signal controlling switching operations of the switch for a predetermined set period of time and calculating the maximum on-time according to the detection voltage peak and the overcurrent reference voltage.

15. The power factor correction circuit of claim 14, wherein the maximum on-time calculating unit includes:
a current source generating a first current according to the overcurrent protection threshold voltage for the set period of time; and
a capacitor coupled to the current source, and
the maximum on-time calculating unit generates a first voltage by supplying the first current to the capacitor for a period of time according to the PWM signal, and generates the overcurrent reference voltage by sampling the first voltage.

16. The power factor correction circuit of claim 15, wherein the maximum on-time calculating unit further includes a transistor coupled to the capacitor in parallel, and switching-operated according to a signal in which the PWM signal is inverted, and a sampling period of the first voltage is synchronized with the PWM signal.

17. The power factor correction circuit of claim 14, wherein the maximum on-time calculating unit includes:
a current source generating a second current according to the detection voltage peak not for the set period of time but for a non-set period of time;
a capacitor coupled to the current source; and
a comparator comparing the voltage of the capacitor and the overcurrent reference voltage, and the maximum on-time is determined according to an output of the comparator.

18. The power factor correction circuit of claim 13, wherein the overcurrent protection circuit includes:
   a line voltage detecting unit generating a line detection voltage by detecting the line input voltage;
   a peak detecting unit detecting a line period peak which is a line period unit peak of the line input voltage; and
   a maximum on-time calculating unit setting an overcurrent reference voltage corresponding to an overcurrent reference using the line detection voltage and a PWM signal controlling switching operations of the switch for an overcurrent threshold period of time in which the peak of the switch current is the same as a threshold value, and calculating a maximum on-time according to a result of comparing a voltage generated based on the line period peak and the PWM signal and the overcurrent reference voltage.

19. The power factor correction circuit of claim 18, wherein the maximum on-time calculating unit includes:
   a current source generating a first current according to the line detection voltage for the overcurrent threshold period of time; and
   a capacitor coupled to the current source, and
   the maximum on-time calculating unit generates a first voltage by supplying the first current to the capacitor for a period of time according to the PWM signal, and generates the overcurrent reference voltage by sampling the first voltage.

20. The power factor correction circuit of claim 19, wherein the maximum on-time calculating unit further includes a transistor coupled to the capacitor in parallel, and switching-operated according to a signal in which the PWM signal is inverted, and
   a sampling period of the first voltage is synchronized with the PWM signal.

21. The power factor correction circuit of claim 19, wherein the maximum on-time calculating unit generates the overcurrent reference voltage by multiplying the sampled voltage by a first ratio, and
   the first ratio is a ratio of an overcurrent threshold voltage corresponding to the threshold value with respect to a predetermined overcurrent protection threshold voltage.

22. The power factor correction circuit according to claim 18, wherein the maximum on-time calculating unit includes:
   a current source generating a second current according to the line period peak after the overcurrent threshold period of time;
   a capacitor coupled to the current source; and
   a comparator comparing the voltage of the capacitor and the overcurrent reference voltage, and
   the maximum on-time is determined according to an output of the comparator.

\* \* \* \* \*